United States Patent Office 3,274,273
Patented Sept. 20, 1966

3,274,273
DEHYDROHALOGENATION PROCESS
George R. Lester, Mount Prospect, and Cecelia J. Adams, Chicago, Ill., assignors to Universal Oil Products Company, Des Plaines, Ill., a corporation of Delaware
No Drawing. Filed Mar. 16, 1964, Ser. No. 352,321
10 Claims. (Cl. 260—666)

This invention relates to dehydrohalogenation of halohydrocarbons. More particularly, this invention relates to an improved catalyst for effecting dehydrohalogenation of halohydrocarbons and optimum separation of hydrogen halide from the dehydrohalogenation reaction mixture at reaction conditions.

Olefinic hydrocarbons are prepared by dehydrohalogenation of halohydrocarbons. Although dehydrohalogenation can be effected by heating the halohydrocarbon at decomposition temperature, it is preferable to employ a catalyst and effect dehydrohalogenation at milder reaction conditions. It is also desirable to separate the hydrogen halide from the reaction mixture substantially immediately as it is formed to obviate recombination with the olefin product. Certain of the basic metal oxides, particularly the oxides of magnesium, calcium and zinc, effect dehydrohalogenation of halohydrocarbons and are also suitably adapted to the separation of hydrogen halide from the reaction mixture. Dehydrohalogenation is effected in contact with the metal oxide forming halogen combined with the metal oxide and the desired olefin. The exact nature of the combined halogen has not been ascertained. It may be that the combined halogen exists as a hydrogen halide adsorbed on the metal oxide in physical and/or chemical combination therewith. On the other hand, the halogen may exist as a halide of the particular metal oxide, for example magnesium bromide. It is contemplated that the nature of the combined halogen is a combination of the above forms.

Regardless of the nature of the combined halogen, the described basic metal oxides have an unusual capacity for hydrogen halide at dehydrohalogenation reaction conditions which make them peculiarly adapted to separation of the same from a dehydrohalogenation reaction mixture, the metal oxides being subsequently regenerated by oxidative treatment. The frequency with which regeneration is necessitated is, of course, dependent on the capacity of the metal oxide for the hydrogen halide.

It has been observed that while the basic metal oxides effect dehydrohalogenation, in so doing their capacity for hydrogen halide is not fully realized and more frequent regeneration is necessitated than is theoretically required.

It is an object of this invention to disclose an improved basic metal oxide composite for effecting dehydrohalogenation of halohydrocarbons and optimum separation of hydrogen halide from the dehydrohalogenation reaction mixture at reaction conditions.

In one of its broad aspects, the present invention embodies a method of dehydrohalogenating an alkyl halide and separating hydrogen halide from the dehydrohalogenation reaction mixture at reaction conditions, which method comprises contacting the alkyl halide with a catalytic composite at dehydrohalogenation conditions, said catalytic composite comprising an oxide of a metal selected from a group consisting of magnesium, calcium and zinc, and an oxide of a metal selected from the group consisting of copper and cerium, sorbing the hydrogen halide on the catalytic composite and recovering an olefinic hydrocarbon.

Other objects and embodiments relating to the method of this invention will become apparent in the following detailed specification.

Dehydrohalogenation reaction conditions relate principally to temperature. Dehydrohalogenation is usually effected in the presence of a catalyst at a temperature of from about 50° C. to about 550° C., a temperature in the lower range, say from about 50° C. to about 450° C., being suitable in the treatment of monohalides, and a temperature in the higher range, say from about 200° C. to about 550° C., being suitably employed in the treatment of dihalides.

The catalytic composite utilized in accordance with the method of this invention and comprising an oxide of a metal selected from the group consisting of magnesium, calcium and zinc, hereinafter referred to as basic metal oxides, and an oxide of a metal selected from the group consisting of copper and cerium, may be prepared by any conventional or otherwise convenient means. For example, the magnesium oxide, calcium oxide, or zinc oxide, can be soaked, dipped, or otherwise immersed in an ammoniacal aqueous solution of a soluble compound of copper or cerium, for example, copper nitrate, cerium nitrate, and the like, for a suitable period of time during which excess water is evaporated therefrom, or after which excess solution is decanted therefrom. The foregoing procedure may be repeated one or more times with or without intermediate drying to achieve the desired composite. One preferred method of preparation is set out in the appended examples.

The catalytic composite is preferably prepared in a particulate form which may be granular or shaped particles of definite size and shape. The basic metal oxide is usually prepared in the desired particulate form prior to combination with the copper or cerium oxide as the case may be. Particles of definite size and shape may be prepared by commingling a powdered form of the basic metal oxide, or of the catalytic composite, with a suitable pelleting agent including hydrogenated vegetable oils, graphite, etc., and compressing the same into pellets. The catalytic composite may also be formed into the desired shape by extrusion methods, or utilized as granules of varied size and shape.

In the separation of hydrogen halide from a dehydrohalogenation reaction mixture as herein contemplated, the presence of copper oxide, or of cerium oxide, in an amount in excess of about 15%, based on the weight of the final catalytic composite, is undesirable as the said oxides tend to oxidize hydrogen halide on contact therewith to form elemental halogen. The elemental halogen in turn tends to add to the olefinic hydrocarbon product present in the reaction mixture with the ultimate result of producing undesired by-products. A catalytic composite containing from about 0.1 to 15 wt. percent copper oxide or cerium oxide is suitable. However, in a preferred embodiment, a catalytic composite comprising from about 0.1 to about 10 wt. percent copper oxide or cerium oxide is utilized. For example, one of the preferred embodiments of this invention is in a method of dehydrohalogenating an alkyl halide and separating hydrogen halide from the dehydrohalogenation reaction mixture at dehydrohalogenation reaction conditions, which method comprises contacting the alkyl halide with a catalytic composite at a temperature of from about 50° C. to about 500° C., said catalytic composite comprising magnesia and from about 0.1 to about 10 wt. percent copper oxide, sorbing the hydrogen halide on the catalytic composite and recovering an olefinic hydrocarbon.

Regardless of the method of compositing the copper oxide or the cerium oxide with the basic metal oxide, the resulting composite is dried, usually at a temperature of from about 95° C. to about 200° C., and preferably calcined. The composite is suitably calcined at a temperature of from about 400° C. to about 800° C., and preferably at a temperature of from about 500° C. to about 700° C. Calcination can be effected in any suitable atmosphere. Usually calcination is effected in the presence of air or other oxidizing media, although in some cases calcination may be effected in an inert atmosphere such as nitrogen. The composite is suitably calcined in a period of from about 30 minutes at relatively high temperatures to about 10 hours at a relatively low temperature. The calcined composite may be water-washed and dried to remove traces of sodium or other like metals which may be present to prevent subsequent formation of difficultly oxidizable metal halides during the hydrohalogenation reaction.

Alkyl halides subject to dehydrohalogenation in accordance with the method of this invention include particularly alkyl bromides, for example, ethyl bromide, propyl bromide, butyl bromide, pentyl bromide, hexyl bromide, heptyl bromide, octyl bromide, nonyl bromide, and higher homologs thereof containing up to about 20 carbon atoms, and also the various position and structural isomers thereof including 2-bromopropane, 2-bromobutane, 2-bromopentane, 3-bromopentane, 2-bromohexane, 3-bromohexane, t-butyl bromide, 2-bromo-2-methylbutane, 2-bromo-2,3-dimethylbutane, 2-bromo-2-methylpentane, 3-bromo-3-methylpentane, 2-bromo-2,3-dimethylpentane, 2-bromo-2,4-dimethylpentane, 2-bromo-2-methylhexane, and the like, and also cycloalkyl bromides, such as cyclobutyl bromide, cyclopentyl bromide, cyclohexyl bromide, cycloheptyl bromide, 1,2- and 9-bromo-decahydronaphthalenes, etc., and also alkyl dibromides including 2,3-dibromobutane, 1,3-dibromobutane, 2,2-dibromobutane, 2,3-dibromo-2-methylbutane, 2,3-dibromo-2,3-dimethylbutane, 2,3-dibromo-2,3-dimethylpentane, 2,3-dibromohexane, 2,3-dibromo-2-methylhexane, 2,3-dibromo-2,3-dimethylhexane, 3,4-dibromo-3-methylhexane, 3,4-dibromo-3,4-dimethylhexane, etc. The corresponding alkyl chlorides, fluorides and iodides may also be treated according to the method of this invention, for example ethyl chloride, propyl chloride, 2-chloropropane, 2-chlorobutane, 2-chloro-2-methylbutane, cyclopentyl chloride, 2,3-dichlorobutane, 2,3-dichloro-2-methylbutane, ethyl fluoride, propyl fluoride, 2-fluoropropane, 2-fluorobutane, 2-fluoro-2-methylbutane, cyclopentyl fluoride, 2,3-difluorobutane, 2,3-difluoro-2-methylbutane, ethyl iodide, 2-iodopropane, cyclopentyl iodide, 2,3-diiodobutane, etc.

The method of this invention can be utilized to effect a continuous type of operation. For example, the alkyl halide is charged to a reactor at dehydrohalogenation reaction conditions, said reactor containing therein a fixed bed of catalytic composite herein described. The olefinic hydrocarbon product is recovered from the reactor effluent and hydrogen halide is sorbed on the said composite. Before the capacity of the catalytic composite for hydrogen halide is reached or exceeded, the alkyl halide charge is halted and a stream of air is directed over the catalytic composite at conditions effecting oxidation of the hydrogen halide and regeneration of the catalytic composite. The alkyl halide charge is periodically alternated with the air flow to effect a continuous type of operation.

The method of this invention presents a number of advantages. For example, hydrogen halide resulting from the dehydrohalogenation reaction is substantially immediately separated from the reaction mixture at reaction conditions and bound in physical and/or chemical combination with the catalytic composite in preference to recombination or reaction with the olefin product. Furthermore, optimum capacity of the catalytic composite for hydrogen halide is realized at dehydrohalogenation reaction conditions. In this manner, the frequency with which the catalytic composite must be regenerated is minimized.

The following examples are presented in illustration of the method of this invention. It is not intended that said examples shall act as an undue limitation on the generally broad scope of this invention as set out in the appended claims.

Example I

A catalytic composite consisting of 6% copper oxide on magnesia was prepared as follows: A cupric tartrate ($CuC_4H_4O_6$) was prepared by adding a solution of 114 grams of cupric nitrate trihydrate in 100 cubic centimeters of water to a solution of 109 grams of sodium tartrate dihydrate ($Na_2C_4H_4O_6 \cdot 2H_2O$) in 400 cubic centimeters of water. The precipitate was filtered from the supernatant liquid and water-washed with 500 cubic centimeters of water. This procedure was repeated four times. Thereafter, the cupric tartrate was prepared in solution with 800 cubic centimeters of 0.6 N sodium hydroxide solution. 286 cubic centimeters of the cupric tartrate solution was then diluted with 550 cubic centimeters of water and 317.4 grams of magnesium oxide was immersed therein. The mixture was evaporated to dryness in a rotary steam evaporator and thereafter calcined at 600° C. for two hours.

The described catalytic composite was subjected to a comparative test with a magnesia catalyst which had been calcined at 600° C. for a two hour period to determine its dehydrobromination activity and capacity for hydrogen bromide with respect to the activity and capacity of the magnesia catalyst. Fifty cubic centimeters of the catalyst to be tested, 4–20 mesh, was located in a fixed bed of a tubular glass reactor of 120 cubic centimeters capacity. The catalyst was disposed immediately below 50 cubic centimeters of porcelain rings utilized to preheat the charge to about 300° C. 1,3-dibromobutane was charged down flow through the catalyst bed at a liquid hourly space velocity of about 1.0. The temperature rise in the bed was 130–160° C. The reactor effluent was passed through a trap maintained at about 0° C., and through a scrubber containing 3 N sodium hydroxide. The gaseous product was collected over saturated salt water in a Goeckel bottle. Each test was continued until hydrogen bromide was observed in the reactor effluent. The gaseous product was analyzed by mass spectrographic and gas-liquid chromatography methods. The following tabulation of results obtained with the two catalysts is indicative of the dehydrobromination activity and capacity for hydrogen bromide of the catalyst of this invention as compared with the basic metal oxide, magnesia.

|  | Magnesia-copper oxide | Magnesia |
|---|---|---|
| Charge, grams | 57.8 | 31.6 |
| Catalyst, grams | 26.5 | 21.9 |
| Catalyst, Recovery: |  |  |
| Wt., grams | 68.2 | 45.7 |
| Percent $Br_2$ | 58.1 | 48.5 |
| $Br_2$, grams | 40.1 | 22.4 |
| Conversion, wt. percent | 99.6 | 96.2 |
| Yield:[1] |  |  |
| $C_4H_6$ | 6.0 | 7.9 |
| $C_4H_8$ | 40.6 | 32.2 |

[1] Mols/100 mols charge converted.

Example II

In this example, the magnesia catalyst and the magnesia-copper oxide of Example I were tested in substantially the same manner as above with the exception that 2,3-dibromobutane was utilized as a charge stock. The comparative results of this test are tabulated below.

|  | Magnesia-copper oxide | Magnesia |
|---|---|---|
| Charge, grams | 64.2 | 37.4 |
| Catalyst, grams | 25.7 | 20.8 |
| Catalyst, Recovery: |  |  |
| Wt., grams | 67.7 | 43.4 |
| Percent $Br_2$ | 60.9 | 50.7 |
| $Br_2$, grams | 41.6 | 22.4 |
| Conversion, wt. percent | 96.1 | 84.2 |
| Yield:[1] |  |  |
| $C_4H_6$ | 12.1 | 4.8 |
| $C_4H_8$ | 51.0 | 36.5 |

[1] Mols/100 mols charge converted.

We claim as our invention:

1. A method of dehydrohalogenating an alkyl halide and simultaneously separating hydrogen halide from the dehydrohalogenation reaction mixture at reaction conditions, which method comprises contacting the alkyl halide with a hydrogen halide sorptive catalytic composite at dehydrohalogenation conditions, said catalytic composite comprising an oxide of a metal selected from the group consisting of magnesium, calcium and zinc, and an oxide of a metal selected from the group consisting of copper and cerium, sorbing the hydrogen halide on the catalytic composite and recovering an olefinic hydrocarbon.

2. A method of dehydrohalogenating an alkyl halide and simultaneously separating the resulting hydrogen halide from the dehydrohalogenation reaction mixture at reaction conditions which comprises contacting the alkyl halide with a hydrogen halide sorptive catalytic composite at a temperature of from about 50° C. to about 500° C., said catalytic composite comprising an oxide of a first metal selected from the group consisting of magnesium, calcium and zinc, and from about 0.1% to about 15% of an oxide of a second metal selected from the group consisting of copper and cerium, sorbing the hydrogen halide on the catalytic composite and recovering an olefinic hydrocarbon.

3. The method of claim 2 where said first metal is magnesium.

4. The method of claim 2 wherein said first metal is calcium.

5. The method of claim 2 wherein said first metal is zinc.

6. The method of claim 2 wherein said second metal is copper.

7. A method of dehydrohalogenating an alkyl halide and simultaneously separating the resulting hydrogen halide from the dehydrohalogenation reaction mixture at reaction conditions which comprises contacting the alkyl halide with a hydrogen halide sorptive catalytic composite at a temperature of from about 50° C. to about 500° C., said catalytic composite comprising magnesia and from about 0.1% to about 10% copper oxide, sorbing the hydrogen halide on the catalytic composite and recovering an olefinic hydrocarbon.

8. The method of claim 7 wherein said alkyl halide is 2,3-dibromobutane and said olefinic hydrocarbon is butadiene.

9. The method of claim 7 wherein said alkyl halide is cyclohexyl bromide and said olefinic hydrocarbon is cyclohexene.

10. The method of claim 7 wherein said alkyl halide is isopropyl bromide and said olefinic hydrocarbon is propylene.

References Cited by the Examiner
UNITED STATES PATENTS

| | | | |
|---|---|---|---|
| 2,379,697 | 7/1945 | Evans | 260—680 |
| 2,389,231 | 11/1945 | Blumer | 260—680 |
| 2,436,491 | 2/1948 | Schmerling | 260—677 |
| 2,490,973 | 12/1949 | Leonard | 260—666 |

DELBERT E. GANTZ, *Primary Examiner.*

V. O'KEEFE, *Assistant Examiner.*